United States Patent
Dhebar et al.

(10) Patent No.: US 11,631,054 B1
(45) Date of Patent: Apr. 18, 2023

(54) AUTOMATICALLY CORRECTING DISCREPANCIES IN TIME RECORDS

(71) Applicant: Amazon Technologies, Inc., Seattle, WA (US)

(72) Inventors: Niraj Dhebar, Sammamish, WA (US); Charles Filson, Kirkland, WA (US); Matthew Feist, Renton, WA (US); Senthil Anand Balakrishnan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 215 days.

(21) Appl. No.: 16/219,079

(22) Filed: Dec. 13, 2018

(51) Int. Cl.
| | | |
|---|---|---|
| *G06Q 10/10* | (2012.01) | |
| *G06F 16/23* | (2019.01) | |
| *G06N 20/00* | (2019.01) | |
| *G06F 21/62* | (2013.01) | |
| *G06Q 10/1091* | (2023.01) | |

(52) U.S. Cl.
CPC ..... *G06Q 10/1091* (2013.01); *G06F 16/2358* (2019.01); *G06F 16/2365* (2019.01); *G06F 21/6218* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,972,660 B1* | 12/2005 | Montgomery, Jr. | G07C 9/37 340/5.52 |
| 9,471,900 B1* | 10/2016 | Boustany | G06Q 10/1091 |
| 2007/0234405 A1* | 10/2007 | Chikada | H04L 63/0853 726/3 |
| 2009/0184823 A1* | 7/2009 | Tessier | G06Q 10/06 340/568.1 |
| 2015/0095171 A1* | 4/2015 | Morgan | G06Q 10/105 705/16 |
| 2015/0327011 A1* | 11/2015 | Fairbanks | G01S 5/013 455/456.3 |
| 2016/0171451 A1* | 6/2016 | Pugh | G06Q 10/1093 705/7.18 |
| 2017/0301039 A1* | 10/2017 | Dyer | H04M 1/00 |
| 2017/0364868 A1* | 12/2017 | Ramachandran | G06Q 10/1091 |
| 2018/0308063 A1* | 10/2018 | Jan | G07C 9/28 |
| 2019/0052647 A1* | 2/2019 | Ford | G06F 21/604 |
| 2019/0057340 A1* | 2/2019 | Wang | G06F 16/29 |
| 2019/0236510 A1* | 8/2019 | Kwak | G07C 5/008 |
| 2019/0318320 A1* | 10/2019 | Scarpati | G06Q 10/06393 |
| 2020/0162275 A9* | 5/2020 | Breazeale, Jr. | G16H 40/67 |

\* cited by examiner

*Primary Examiner* — Nathan A Mitchell
*Assistant Examiner* — Kimberly S. Bursum
(74) *Attorney, Agent, or Firm* — Thomas | Horstemeyer, LLP

(57) ABSTRACT

Disclosed are various embodiments for assisting time tracking using activity indicators. An activity indicator for a user is received by a computing device. The current status and the current schedule of the user are obtained. A determination can then be made that the current status of the user is incorrect based at least in part on a comparison between the activity indicator and the current schedule of the user. In response, the current status of the user can be corrected.

20 Claims, 4 Drawing Sheets

AUTOMATICALLY CORRECTING DISCREPANCIES IN TIME RECORDS

BACKGROUND

Individuals often track time for various activities. For example, athletes may track how much time it takes to perform a particular exercise or drill in order to measure athletic performance or improvement. Contractors may track how much time is spent on a task in order to accurately bill customers for services. Similarly, employers may track how much time an hourly employee works in order to accurately pay the employee.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
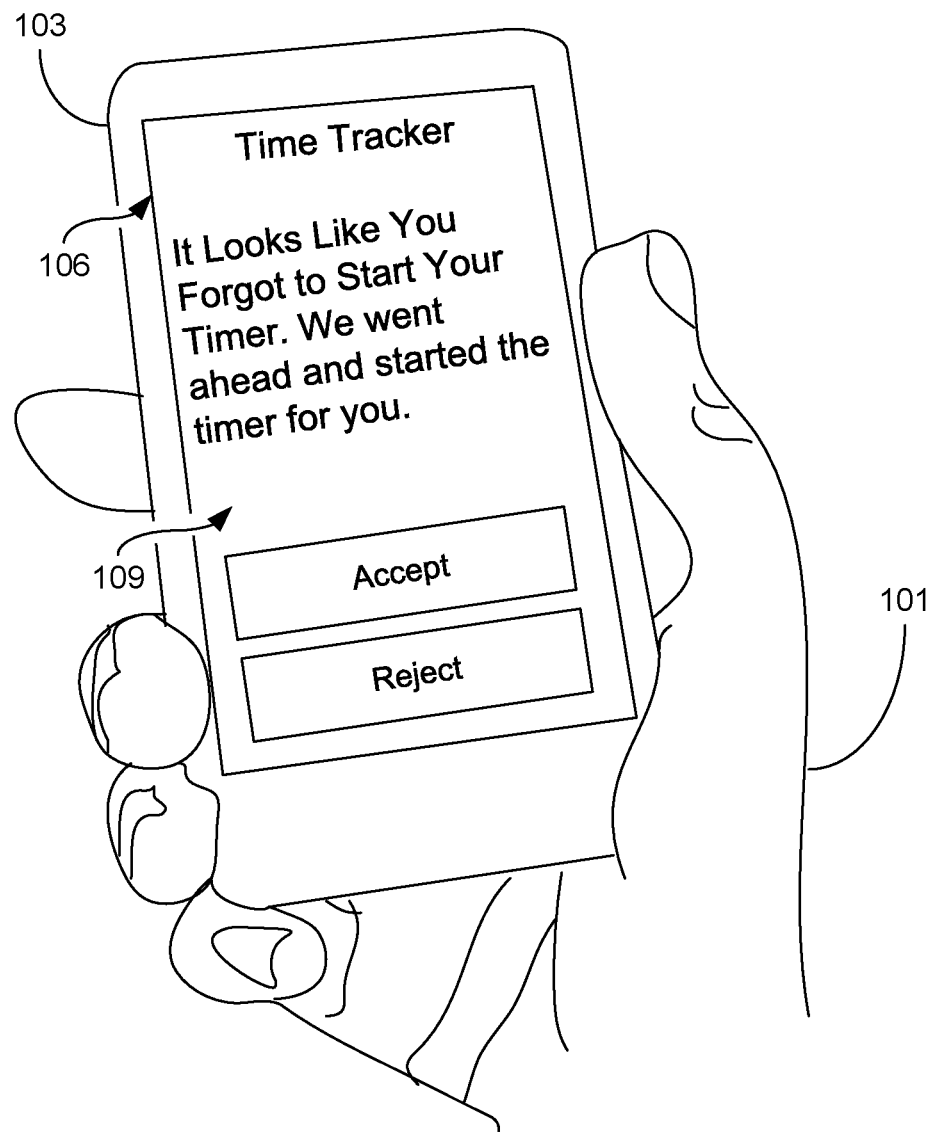
FIG. 1 is a drawing depicting one of several embodiments of the present disclosure.

Disclosed are various approaches for automatically correcting time records when a user is performing an activity. Many time-tracking systems require a user to manually indicate the beginning or end of an activity. As a simple example, coaches or athletes may need to press a button on a stop-watch to start or stop the timer. As another example, employees may "clock-in" or "clock-out" at the beginning and end of a shift in order to report the hours they work to an employer.

However, these time-tracking systems are susceptible to errors. For example, sometimes people forget to indicate the beginning or end of an activity. A contractor may forget to record his or her time or forget to start or stop a timer. Likewise, an employee may forget to clock-in or clock-out at the beginning or end of a shift. Similarly, an athlete or coach may forget to start a timer on a stop-watch. As another example, sometimes a system error results in a record-keeping error. For example, an individual may press a button on a timer or place a punch-card into a time-clock, but the button may fail to start or stop the timer or the time-clock may fail to record the time. This can result in inaccurate records.

Although these records can be corrected manually, it is impractical to do so in some instances. For example, a small company with twenty-five employees can manually correct a time-keeping error when one employee forgets to clock in at the start of his or her shift one day. However, an enterprise that employs tens of thousands or hundreds of thousands of employees would find it impractical to manually correct time-keeping errors. For example, if an enterprise employed one-hundred thousand hourly employees and had an error rate each day of 0.01% (e.g., due to equipment errors, human error, or other issues), the enterprise would still have to manually correct up to 1,000 time-entry errors per day. This would require dozens of people employed full-time to manually correct each day's time-entry errors.

Similarly, it may be impossible to manually verify the start of an activity. For example, a coach or an athlete may not be able to manually identity the start and end times of a training exercise after it has been completed with the precision necessary to determine the time it took to complete the exercise (e.g., the time a lap around a track required). As another example, an administrator may not be able to manually verify, and an employee may not remember, when the exact time when employee started or ended his or shift or took a break.

Accordingly, various embodiments of the present disclosure involve approaches to automating the identification of time-tracking errors and correcting them. Indicators of user activity can be used to identify when a user is performing a task. These indicators can be cross-referenced with the current status of a user to determine whether the time of the user is being correctly tracked. If a discrepancy is identified, it can be corrected to match the user's current activity. As a result, large enterprises with thousands of employees entering time can practically, economically, and efficiently correct inadvertent time-keeping errors made by their employees, as previously discussed above. In the following discussion, a general description of the system and its components is provided, followed by a discussion of the operation of the same.

As illustrated in FIG. 1, user 101 is interacting with a client device 103, as further described herein. The client device 103 may have a display 106 which may render a user interface 109. As depicted, a user 101 may have been performing, or continue to perform, an activity, but had forgotten to begin tracking his or her time. For example, a runner may have forgotten to start a stop-watch or timer, a contractor may have forgotten to start a timer, or an employee may have forgotten to clock-in at the beginning of his or her shift. Various embodiments of the present disclosure are capable of detecting the oversight or omission and automatically correcting it. The user 101 could then be notified with a message rendered within the user interface 109 and presented with the option to accept or reject the correction.

Figure 2:
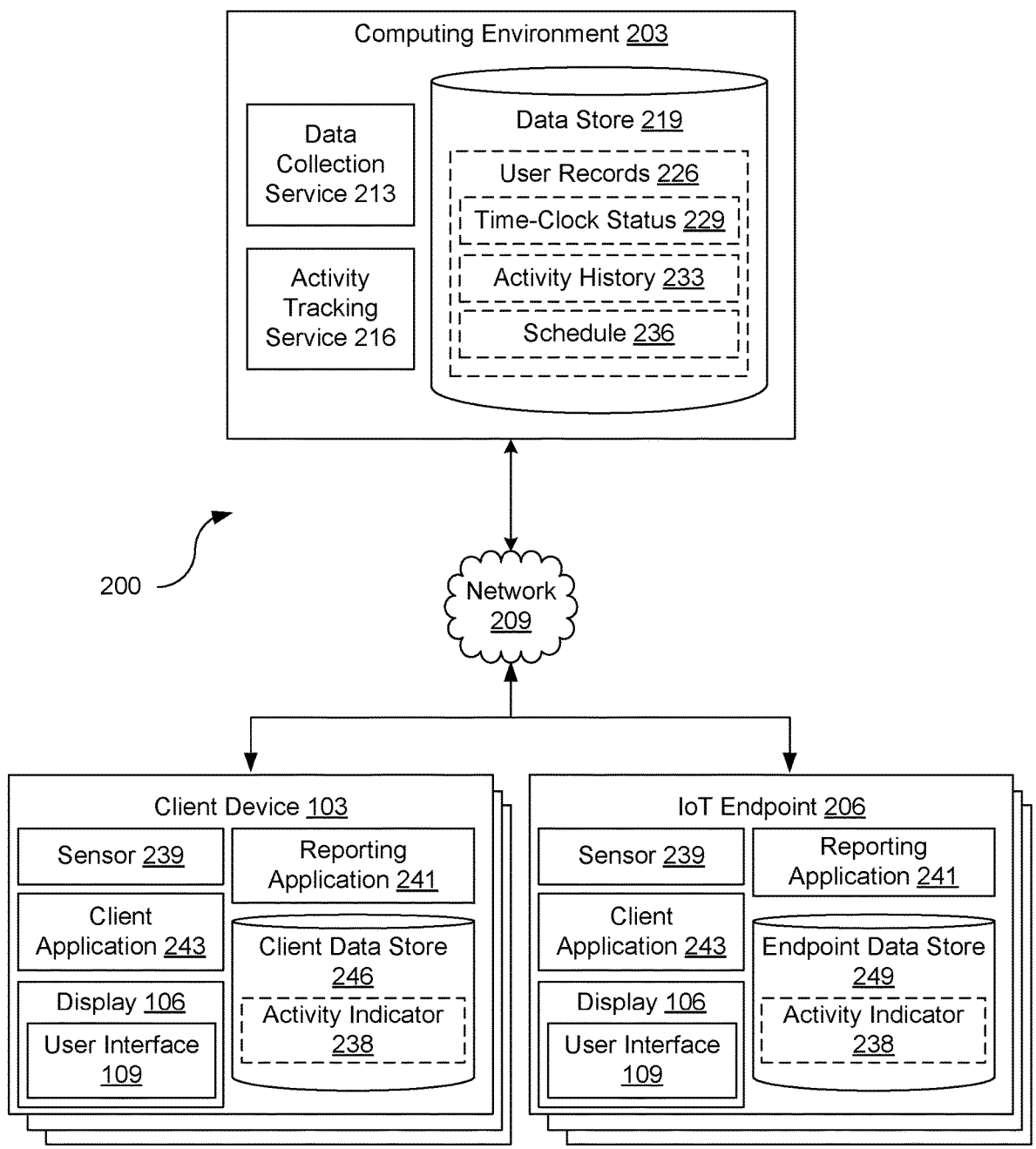
FIG. 2 is a drawing of a networked environment according to various embodiments of the present disclosure.

With reference to FIG. 2, shown is a networked environment 200 according to various embodiments. The networked environment 200 includes a computing environment 203, one or more client devices 103, and one or more Internet of Things (IoT) endpoints 206. The client devices 103 and the IoT endpoints 206 may be are in data communication with the computing environment 203 via a network 209. The network 209 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The computing environment 203 may include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may include a hosted computing resource, a grid computing resource or any other distributed computing arrangement. In some cases, the computing environment 203 may correspond to an elastic computing resource where the allotted capacity of processing, network, storage, or other computing-related resources may vary over time.

Various applications or other functionality may be executed in the computing environment 203 according to various embodiments. The components executed on the computing environment 203, for example, include a data collection service 213, an activity tracking service 216, and other applications, services, processes, systems, engines, or functionality not discussed in detail herein.

Also, various data is stored in a data store 219 that is accessible to the computing environment 203. The data store 219 may be representative of a plurality of data stores 219, which can include relational databases, object-oriented databases, hierarchical databases, hash tables or similar key-value data stores, as well as other data storage applications or data structures. The data stored in the data store 219 is associated with the operation of the various applications or functional entities described below. This data can include user records 226, and potentially other data.

A user record 226 may represent information related to a user 101 (FIG. 1) of the activity tracking service 216. This information can include an time-clock status 229 of the user 101, the activity history 233 of the user 101, and one or more schedules 236 associated with the user 101. Various embodiments of the present disclosure may also store additional information related to the user 101 as part of a user record 226.

The time-clock status 229 can represent a current status of an activity being performed by a user 101. For example, in the case of an employee, it could represent whether an employee is currently working or is currently on a break or otherwise off the clock. In the case of a contractor, it could represent the project or client for which the contractor is performing a service. In the case of other types of users, such as athletes, it could represent whether the athlete is currently training or performing an exercise (e.g., running, swimming, etc.) or is currently resting. Other types of time-clock statuses 229 may also be used according to various embodiments of the present disclosure.

The activity history 233 (e.g., a time-clock history of time-clock activity) represents a history of a user's 101 activity compiled from various activity indicators 253, which are described in further detail herein. The activity history 233 can be used by the activity tracking service 216 to draw conclusions about the time-clock status 229 of a user 101. For example, if an athlete has historically moved at or above certain speeds while the time-clock status 229 is set to running, jogging, swimming, bicycling, or performing some other type of activity, the activity history 233 could be used to determine that when the user 101 is moving at or above a certain speed, the user 101 is running, jogging, swimming, bicycling, etc. As another example, if the activity history 233 shows that an employee regularly scans a security badge to enter a building approximately five minutes before clocking in, then the activity history 233 could be used to determine that the time-clock status 229 of the user 101 should be set to being on the clock approximately five minutes after scanning a security badge. As a similar example, if the activity history 233 shows that an employee typically signs into his or her computer two minutes before clocking in, then the activity history 233 could be used to determine that the time-clock status 229 of the user 101 should be set to being on the clock approximately two minutes after signing in to the computer. Many other types of activity history 233 records or associations may be used in various embodiments of the present disclosure, as further described herein.

The schedule 236 can represent the expected time-clock status 229 of a user 101 or the historical time-clock status 229 of a user 101. For instance, a schedule 236 could specify the dates and times that an employee is expected to be at work or on the clock. As another example, the schedule 236 could specify the times that an athlete has planned training sessions.

The data collection service 213 can be executed to collect or otherwise receive activity indicators 238 for a user 101 from client devices 103. The activity indicators 238 can then be stored in the activity history 233 of the user record 226 for the respective user 101. However, in some instances the data collection service 213 may instead be executed to identify activity indicators 238. For example, some client devices 103 may not explicitly report activity indicators 238. However, usage of the client device 103 or interaction with the client device 103 by a user 101 may provide an indication of the correct time-clock status 229 of the user 101. In these instances, the data collection service 213 may monitor usage of a client device 103 to identify activity indicators 238 related to the client device 103.

The activity tracking service 216 can be executed to track and verify the time-clock status 229 of a user 101. Examples of activity tracking services 216 include time-keeping applications or services used to track an employee's or a contractors hours, fitness tracking applications to track athletic performance (e.g., lap times, distance times, etc.), and similar applications. For example, the activity tracking service 216 may receive activity indicators 238 from client devices 103 (e.g., time-clocks, fitness trackers, mobile devices, electronic access controls, personal computers, industrial equipment, etc.) and use the activity indicators 238 to verify the time-clock status 229 of the user 101.

The client device 103 is representative of a plurality of client devices 103 that may be coupled to the network 209. The client device 103 may include, for example, a processor-based system such as a computer system. Such a computer system may be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, a voice-controlled speaker system (e.g., AMAZON ECHO® or GOOGLE HOME)), or other devices with like capability.

The client device 103 may include one or more displays 106, such as liquid crystal displays (LCDs), gas plasmabased flat panel displays, organic light emitting diode (OLED) displays, electrophoretic ink ("E-ink") displays, projectors, or other types of display devices. In some instances, the display 106 may be a component of the client device 103 or may be connected to the client device 103 through a wired or wireless connection.

The client device 103 may also include or provide for various mechanisms for a user 101 to provide input or interact with the client device 103. Examples of user input mechanisms include mice, keyboards, keypads, touch screens, microphones, and similar apparatuses. Such input mechanisms may be integrated with the client device 103 or connected to the client device 103. Similarly, the client device 103 may include one or more sensors 239 that can be used to collect data about the environment of the client device 103, or the activity being performed by the client device 103. Examples of sensors 239 can include motion or kinetic sensors that can determine when the client device 103 is in motion (e.g., accelerometers, speedometers, etc.), geolocation sensors (e.g., global positioning (GPS) or similar sensor systems), microlocation sensors (e.g., beacons), temperature sensors, or similar devices.

The client device 103 may be configured to execute various applications as well as collect and store various types of data. For example, the client device 103 may execute applications such as a reporting application 241, a client application 243, or other applications. Some client devices 103 may execute an instance of a reporting application 241 or a client application 243, while other client devices 103 may execute both a reporting application 241 and a client application 243. Different types of client devices 103 may implement different versions of either the reporting application 241 or the client application 243.

Data may be stored in a client data store 246. The client data store 246 which may include relational databases, object-oriented databases, hierarchical databases, hash tables or similar key-value data stores, as well as other data storage applications or data structures. Data stored in the data store can include activity indicators 238 and potentially other types of data.

The activity indicator 238 may represent how a user is currently or has recently interacted with the client device 103. For example, an activity indicator 238 could indicate that a user 101 has used his or her access card to open an electronic access control to a door. As another example, an activity indicator 238 could indicate that a user 101 has started answering phone calls (e.g., in a call center). As another example, an activity indicator 238 could indicate that a user 101 has started using a piece of equipment (e.g., logged into a computer, started using an electronic scanner, etc.). The activity indicator 238 could also indicate that a user has started performing a certain activity by moving in particular manner (e.g., walking, running, jogging, or otherwise moving in previously identified manner). Another example of an activity indicator 238 is that the user has started a timer or has clocked in using a time-tracking application or machine.

The reporting application 241 may be executed to provide instances of activity indicators 238 to the data collection service 213. For example, a personal computer with an instance of the reporting application 241 installed may report to the data collection service 213 whenever a user has logged onto or off of his or her client device 103. As another example, a company issued mobile device may use the reporting application 241 to regularly report its current location to the data collection service 213. However, those client devices 103 which do not execute or implement a reporting application 241 may instead be monitored by the data collection service 213 in order for activity indicators 238 to be identified.

The client application 243 may be executed in a client device 103, for example, to access network content served up by the computing environment 203 or other servers, thereby rendering a user interface 109 on the display 106. To this end, the client application 243 may include, for example, a browser, a dedicated application, or other executable, and the user interface 109 may include a network page, an application screen, or other user mechanism for obtaining user input. The client device 103 may be configured to execute applications beyond the client application 243 such as, for example, email applications, social networking applications, word processors, spreadsheets, or other applications.

However, client devices 103 that lack a display, such as voice controlled client devices 103, may make use of a natural language based interface. In these embodiments, users 101 may speak commands or queries which are recorded by a microphone. The client device 103 can then process the command or query and provide an audio response using a speaker of the client device 103.

An IoT endpoint 206 is representative of a plurality of IoT endpoints 206 that may be coupled to the network 209. The IoT endpoint 206 may embody, for example, a processor-based system such as an embedded computer system, a wearable computer system, an industrial control system, or a similar computing device. Examples of IoT endpoints 206 include electronic scanners or tag readers (e.g., bar-code scanners, radio frequency identification (RFID) scanners, etc.), electronic locks or electronic access control systems, network connected cameras, or other devices with like capability. The IoT endpoint 206 may also have a display 106, a user interface 109, and one or more sensors 239, similar to those used by the client device 103. Similarly, an IoT endpoint 206 may execute a reporting application 241 that operates in the same or similar manner as a reporting application 241 executed by a client device 103. For example, an electronic access control (e.g., an electronic lock) may report every time a user 101 uses his or her access card to enter or leave a restricted area. An IoT endpoint 206 may also operate a client application 243 or maintain an endpoint data store 249 that stores data in the same or similar manner as the client data store 246 (e.g., to store one or more activity indicators 238).

Next, a general description of the operation of the various components of the networked environment 200 is provided. A more detailed description of the operation of individual components is provided in the discussion of subsequent figures.

To begin, the data collection service 213 and the activity tracking service 216 may operate in a learning phase. The data collection service 213 may receive activity indicators 238 from various client devices 103 operated by a user 101 and use the activity indicators 238 to create an activity history 233 for the user 101. Likewise a record of the time-clock status 229 of the user 101 and changes to the time-clock status 229 of the user 101 may be recorded and monitored by the activity tracking service 216. For example, when a user 101 clocks in at the beginning of a shift or clocks out at the end of a shift, the time-clock status 229 received from a time-tracking application or system may be recorded to generate an activity history 233. Likewise, when an athlete begins a training session or ends a training session, the time-clock status 229 may be recorded to generate an activity history 233.

After a sufficient activity history 233 has been collected, which can vary with the needs of each implementation to implementation, the activity tracking service 216 can evaluate the activity history 233 together with previous schedules 236 to identify activity patterns for a user 101 using various machine learning approaches or techniques. Activity patterns can include a pattern of when particular user activities tend to occur, a typical sequence in which a user 101 performs a set of activities, or a period of time that typically elapses between when a first activity is performed by a user 101 and a second activity is performed by the user 101. For example, one activity pattern could be that a user typically scans an access card to a building at a particular time or typically performs a particular workout routine (e.g., a run or swim) at a particular time. Another example of an activity pattern is that an employee typically performs a certain action within a typical period of time after clocking in (e.g., the employee typically begins using a piece of equipment, accesses a particular door, or logs onto a computer several minutes after clocking in). A similar activity pattern would be that a user typically performs a particular activity prior to clocking out (e.g., typically locking his or her workstation before clocking out for a break or logging off of his or her workstation before clocking out for the day). Many other activity patterns may be identified depending on the roles of individual users 101.

Once one or more activity patterns have been identified, the activity tracking service 216 can then monitor the time-clock status 229 of individual users 101 to verify that the time-clock status 229 is correct. For example, the activity tracking service 216 may use the current schedule 236 for a user 101 and the activity history 233 to predict the current time-clock status 229 of a user 101. If the current time-clock status 229 of the user does not match the prediction, it may be corrected by the activity tracking service 216. A number of examples illustrate how this functionality may be implemented.

As a first example, an athlete may use a fitness tracker, smart watch, or similar client device 103 to track his or her workout. The athlete's client device 103 may provide an activity indicator 238 that a user 101 has started or stopped a timer, the speed at which the user 101 is currently moving (e.g., a running or jogging speed, a swimming speed, etc.), and similar data. If the athlete is regularly speeding up and slowing down, the activity tracking service 216 may be able to determine that the athlete is running laps with a break between or swimming laps with a break between. If the athlete begins to speed up, but forgets to start the timer, the activity tracking service 216 may determine that the athlete started another lap but forgot to start a timer based on a discrepancy between the current speed of the athlete and the failure of the time-clock status 229 to be updated by the client device 103 to indicate that the athlete had started a timer. The activity tracking service 216 could then adjust or update the time-clock status 229 to reflect that the athlete started the lap and when the athlete started the lap. The activity tracking service 216 could perform similar analysis to detect when the athlete finished a lap, but forgot to stop his or her timer.

As a second example, an employee may regularly use a time tracking application or machine to record his or her hours working for an employer. The employee may regularly interact with particular client devices 103 prior to or just after beginning a shift. For example, an employee may use an access card to enter the building a few minutes before clocking-in or use the access card to leave the building a few minutes after clocking-out.

As third example, an employee may log onto a client device 103 (e.g., a workstation, cash register, laptop, etc.) shortly after clocking-in. If an employee forgot to clock-in, or the time tracking application or machine failed to record the employee's attempt to clock-in, the activity tracking service 216 could detect that the client device 103 has provided an activity indicator 238 that the user began using the client device 103 at a specific time, but that the time-clock status 229 of the user 101 indicates that the user 101 is supposedly not working. The activity tracking service 216 could then use the activity history 233 of the user 101 and the current schedule 236 of the user 101 to determine that the user 101 is working at the expected time the user 101 would be working, and that the discrepancy with the time-clock status 229 is likely an error. The time-clock status 229 could then be updated for the user 101 to reflect that the user 101 began his or her shift at the time specified by the schedule 236 or at the time indicated by the first activity indicator 238 related to the user 101 that was received that day.

As a fourth example, the activity tracking service 216 could receive activity indicators 238 from a client device 103 regarding the ongoing usage of the client device 103 by a user 101. For example, a client device 103 (e.g., a personal computer or mobile computing device) may provide activity indicators 238 showing that the user 101 is regularly using a client application 243 related to his or her job function. Similarly, the client device 103 (e.g., an electronic scanner or reader linked to a user 101) may provide an activity indicator 238 that the client device 103 is being used. The activity tracking service 216 could then evaluate whether the client device 103 is being used by the user 101 during a time that the user 101 is scheduled to be working according to the schedule 236 of the user 101. If the client device 103 is being used during a time that the schedule 236 for the user 101 indicates that the user 101 is expected to be working, but the time-clock status 229 indicates that the user is not clocked-in, then the activity tracking service 216 could update the time-clock status 229 to reflect that the user clocked-in at the start of his or her shift.

In some implementations, multiple activity indicators 238 may be used together to form a more complete activity history 233 and provide more accurate predictions for the time-clock status 229 of a user 101. For example, a user's 101 keycard access to his or her place of employment might be analyzed in combination with the user's 101 usage of various client devices 103. This could allow the activity tracking service 216 to more accurately identify when the user 101 began his or her shift or ended his or her shift in the event that the user forgot to clock-in or clock-out.

In the event that the time-clock status 229 is updated by the activity tracking service 216, the activity tracking service 216 may send a notification to the user 101. For example, the activity tracking service 216 may send a notification message to the time tracking application used by the user to track his or her time, which can in turn provide a notification to the user 101. As another example, the activity tracking service 216 could send an automated electronic mail (E-mail) or short message service (SMS) message to a client device 103 associated with the user 101. The notification message presented to the user 101 may inform the user 101 of the update to his or her time-clock status 229 and provide the user 101 with a mechanism to accept the change or to dispute or reject the change.

Figure 3:
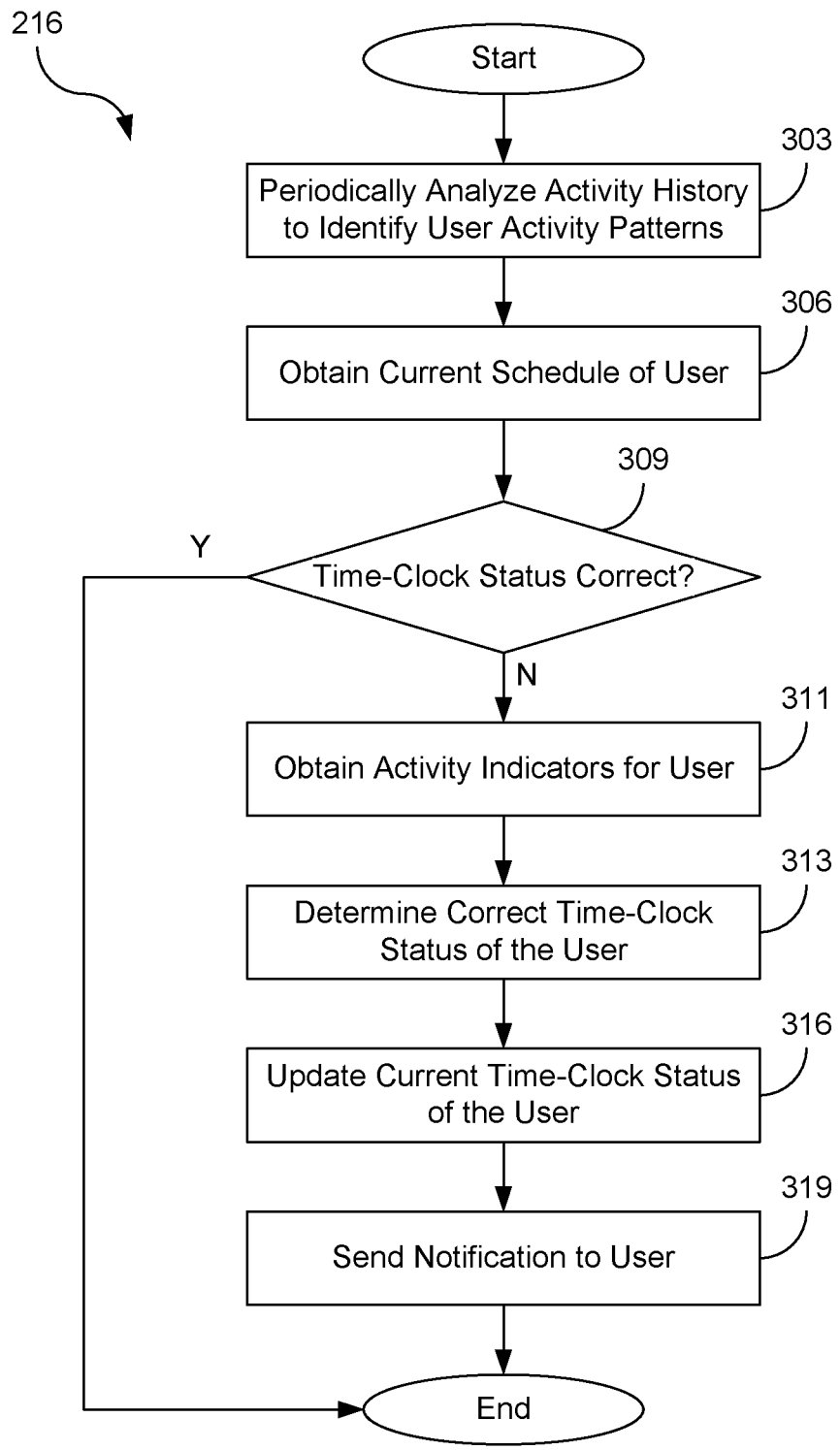
FIG. 3 is a flowchart illustrating one example of functionality implemented as portions of an application executed in a computing environment in the networked environment of FIG. 2 according to various embodiments of the present disclosure.

Referring next to FIG. 3, shown is a flowchart that provides one example of the operation of a portion of the activity tracking service 216 according to various embodiments. It is understood that the flowchart of FIG. 3 provides merely an example of the many different types of functional arrangements that may be employed to implement the operation of the portion of the activity tracking service 216 as described herein. As an alternative, the flowchart of FIG. 3 may be viewed as depicting an example of elements of a method implemented in the computing environment 203 (FIG. 2) according to one or more embodiments.

Beginning with box 303, the activity tracking service 216 may periodically analyze an activity history 233 for individual user records to identify activity patterns present in the activity histories 233. For example, the activity tracking service 216 may analyze the activity history 233 at periodic intervals (e.g., every 5 minutes, 15 minutes, 30 minutes, etc.). As another example, the activity tracking service 216 may analyze the activity history 233 in response to a trigger event (e.g., upon receipt of an activity indicator 238 or in response to a user schedule 236 indicating that a user is supposed to start or stop an activity, such as work).

The activity tracking service 216 may use various statistical or machine learning approaches to identify activity patterns of a user 101 from the activity history 233 of a user 101 or multiple users 101. For example, the activity tracking service 216 may identity times at which individual activities are usually performed, orders or sequences in which activities are performed relative to other activities, how long it normally takes to perform an activity, or how long it normally it takes to start a new activity after completing a previous activity. Other types of activity patterns may also be identified according to various embodiments of the present disclosure.

Then at box 306, the activity tracking service 216 may obtain one or more activity indicators 238 that indicate the current time-clock status 229 of the user 101. For example, the activity tracking service 216 may send a query to the data collection service 213 for one or more activity indicators 238 related to a user record 226 of a user 101. As another example, the activity tracking service 216 may receive activity indicators 238 from the data collection service 213 as the data collection service 213 receives the activity indicators 238.

However, in some implementations, the activity tracking service 216 may operate on previously collected data rather than in real-time or near real-time. For example, the activity tracking service 216 may retrieve all activity indicators 238 stored in the activity history 233 of a user record 226 for a specific period of time (e.g., a particular day, hour, week, etc.). For instance, if the activity tracking service 216 is executed each day to correct errors in the time-clock status 229 from the previous day of individual users 101, then the activity tracking service 216 may retrieve all activity indicators 238 stored in the activity history 233 for the previous day.

At box 306, the activity tracking service 216 may also obtain the current schedule 236 of a user 101 or a schedule 236 from a previous period of time. For example, the activity tracking service 216 may search a user record 226 associated with a user 101 and retrieve the current schedule 236 or a previous schedule 236 of the user 101. The activity tracking service 216 may obtain the current schedule 236 if the activity tracking service 216 is verifying the current time-clock status 229 of the user 101, while it may obtain a previous or historic schedule 236 if the activity tracking service 216 is attempting to validate a prior time-clock status 229 of a user 101.

Next at box 309, the activity tracking service 216 may determine that the time-clock status 229 of a user is incorrect. For example, the activity tracking service 216 may make a prediction of what the expected time-clock status 229 would be. The prediction may be based at least in part on various factors. These factors can include one or more activity indicators 238 reported by reporting applications 239 installed on various client devices 103, the schedule 236 of the user 101, and previously identified activity patterns of the user 101.

As a simple example, the activity tracking service 216 could compare the current time-clock status 229 of a user 101 with the schedule 236 of the user 101. If the schedule 236 indicates that the user is currently supposed to be working, but the time-clock status 229 indicates that the user is not clocked in, then this could indicate that the current time-clock status 229 of the user 101 is incorrect.

The process depicted in the flowchart of FIG. 3 can proceed along one of several different paths from box 309. For example, if the time-clock status 229 of a user 101 is incorrect, then the process would proceed to box 311. Likewise, if the time-clock status 229 is correct, then the process would end until the time-clock status 229 of the user 101 evaluated again.

At box 311, the activity tracking service 216 may obtain activity indicators 238 related to the user. For example, the activity tracking service 216 may search a user record 226 associated with a user 101 and retrieve the activity indicators 238 currently being reported by a client device 103 or IoT endpoint 206 or a previous schedule 236 of the user. Likewise, the activity tracking service 216 may retrieve activity indicators 238 from the activity history 233 of the user record 226 associated with the user 101 that have been received since the previous review of the time-clock status 229 or the user 101.

Proceeding to box 313, the activity tracking service 216 may determine the correct time-clock status 229 of the user 101 after determining that the current time-clock status 229 is incorrect. For example, the activity tracking service 216 may make a prediction of what the expected time-clock status 229 would be. The prediction may be based at least in part on one or more activity indicators 238 reported by reporting applications 239 installed on various client devices 103, the schedule 236 of the user 101, and previously identified activity patterns of the user 101. The activity tracking service 216 could then use the predicted or expected time-clock status 226 as the correct time-clock status 229 for the user 101.

For instance, if a user 101 typically logs onto a workstation several minutes after clocking-in with a time-tracking system, the expected or predicted time-clock status 229 for the user 101 from several minutes before he or she logs onto the workstation until some point after he or she logs onto the workstation would be that the user is clocked-in. If the user has logged onto his or her workstation, but has a time-clock status 229 that shows the user as being off-the-clock, then the activity tracking service 216 would be able to determine that the current time-clock status 229 of the user 101 is incorrect.

Many other activity indicators 238 and activity patterns identified from the activity history 233 may be used to verify, validate, or otherwise determine whether the time-clock status 229 of the user 101 is correct. In some implementations, combinations of activity indicators 238 and activity patterns may be used to more accurately or consistently determine the correctness of the time-clock status 229 of the user 101. When combinations of activity indicators 238 are used as a basis for updating the time-clock status 229, individual activity indicators 238 may be weighted to represent one type of activity indicator 238 being considered more important or more useful than other types of activity indicators 238. For example, an activity indicator 238 representing a user logging on to a workstation may be considered in combination with an activity indicator 238 representing a user scanning an access badge at an entrance to his or her office. The two activity indicators 238 together would represent that a user 101 was present and working. However, the activity indicator 238 from the workstation might be given more weight, because the activity indicator 238 would provide a signal that the user 101 was actually working while an activity indicator 238 received from the entrance to the office building merely signals that a user 101 is present without any further indication that the user 101 has intended to start work.

Moreover, the activity history 233 of other users 101 may also be used as a basis for a determination of the correct time-clock status 229 of a user 101. For example, the activity tracking service 216 may use machine learning to note that a similar user 101 with the same or similar schedule 236 tends to have particular activity indicators 238 reported at certain times or in a certain order. These activity indicators 238 for similar users 101 can be used to determine a correct time-clock status 229 for a user 101. For instance, if other users 101 with a similar schedule 236 and job function typically begin operating a piece of equipment with a predefined period of time after the start of a shift, as recorded by appropriate activity indicators 238, this information could be used to determine a correct time-clock status 229 for the user 101.

Then at box 316, the activity tracking service 216 may update the time-clock status 229 of a user record 226 associated with the user 101. For example, if the activity tracking service 216 determines that the time-clock status 229 is incorrect, the activity tracking service 216 may update the time-clock status 229 to what is predicted to be the correct time-clock status 229. For instance, if an employee has several activity indicators 238 showing that the employee is currently working, even though the time-clock status 229 indicates that the employee is not clocked-in, then the activity tracking service 216 may update the time-clock status 229 to show the employee as being clocked-in.

The activity tracking service 216 may even make such an adjustment retroactively. For example, the activity history 233 of an employee may show that a particular activity indicator 238 or a sequence of activity indicators 238 are normally received within a certain period of time after an employee normally clocks-in for work. Based at least in part on this activity pattern, the activity tracking service 216 might adjust an time-clock status 229 for an employee when there is a discrepancy between the time-clock status 229 and the employee's schedule 236 in order to reflect that the employee has been clocked-in since the point in time prior to receipt of the activity indicator 238 or sequence of activity indicators 238.

The activity tracking service 216 may also update or adjust the time-clock status 229 according to one or more rules. For example, one rule might specify that to resolve a discrepancy in a time-clock status 229 that indicates a user 101 failed to clock-in or clock-out (e.g., if he or she forgot to clock-in or clock-out or the time-clock system had a technical malfunction), then the time-clock status 229 should be updated to match the schedule 236 of the user 101. For example, if the discrepancy is due to a failure to clock-in, the time-clock status 229 may be updated to reflect that the user 101 is currently clocked-in and has been clocked-in since the beginning of his or her scheduled shift. A similar rule could be used for situations where the discrepancy with the time-clock status 229 is related to a failure to clock-out. Another rule could state that, if the time difference between the beginning of a shift of a user 101 and the first activity indicator 238 that indicates the user 101 is working is received is greater than a predefined threshold, then the user 101 can be assumed to have started work late. In such a situation, the time-clock status 229 of the user 101 could be updated to reflect that the user 101 is clocked-in, but only as of the time that the first activity indicator 238 indicating that the user 101 is working was reported to the activity tracking service 216. Additional rules could be created and used as appropriate for various embodiments or implementations.

Next at box 319, the activity tracking service 216 can send a notification to the user 101. For example, the activity tracking service 216 may send a notification message to the time tracking application used by the user 101 to track his or her time, which can in turn provide a notification to the user 101. As another example, the activity tracking service 216 could send an automated electronic mail (E-mail) or short message service (SMS) message to a client device 103 associated with the user 101. The notification message presented to the user 101 may inform the user 101 of the update to his or her time-clock status 229 and provide the user 101 with a mechanism to accept the change or to dispute or reject the change. Thereafter, the operation of the portion of the activity tracking service 216 ends.

Figure 4:
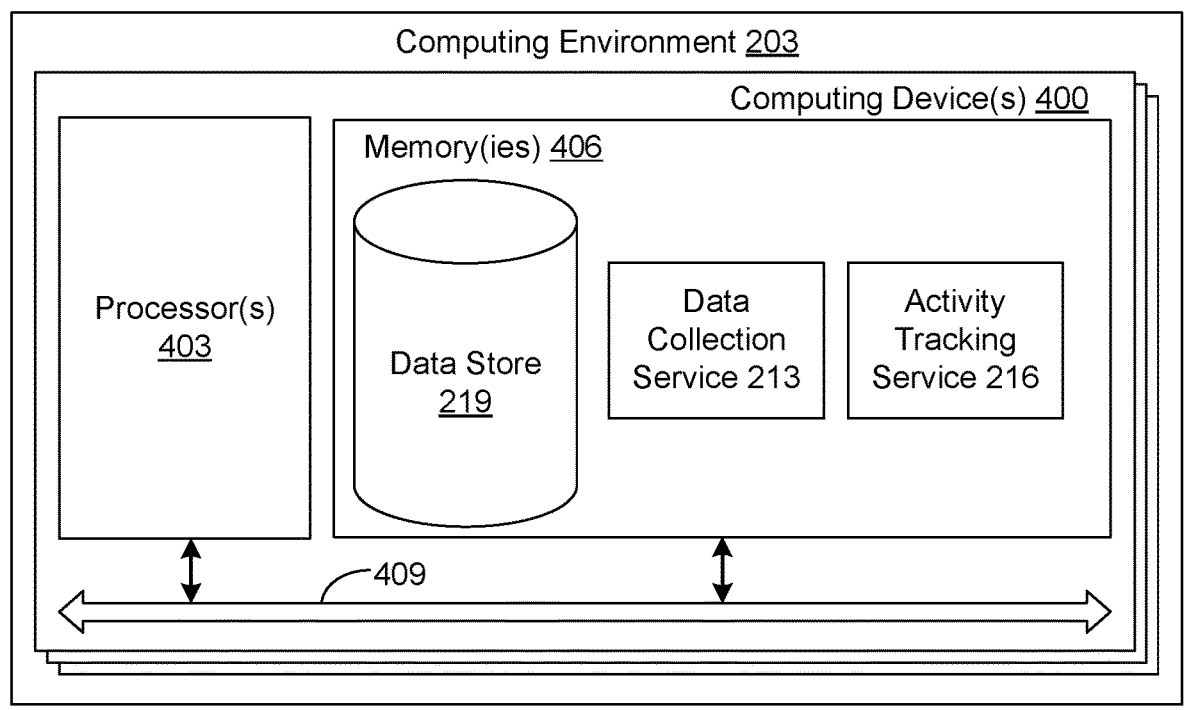
FIG. 4 is a schematic block diagram that provides one example illustration of a computing environment employed in the networked environment of FIG. 2 according to various embodiments of the present disclosure.

With reference to FIG. 4, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may include, for example, at least one server computer or like device. The local interface 409 may include, for example, a data bus with an accompanying address/control bus or other bus structure as can be appreciated.

Stored in the memory 406 are both data and several components that are executable by the processor 403. In particular, stored in the memory 406 and executable by the processor 403 are the data collection service 213, the activity tracking service 216, and potentially other applications. Also stored in the memory 406 may be a data store 219 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 403 may represent multiple processors 403 or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406. The local interface 409 may include additional systems designed to coordinate this communication, including, for example, performing load balancing. The processor 403 may be of electrical or of some other available construction.

Although the data collection service 213, the activity tracking service 216, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the activity tracking service 216. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 403 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data collection service 213 and the activity tracking service 216, that includes software or code can be embodied in any non-transitory computer-readable medium for use by or in connection with an instruction execution system such as, for example, a processor 403 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the data collection service 213 and the activity tracking service 216, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

What is claimed is:

1. A system, comprising:
   a plurality of Internet of Things (IoT) endpoints that execute a reporting application;
   a computing device comprising a processor and a memory; and
   machine-readable instructions stored in the memory that, when executed by the processor, cause the computing device to at least:
      generate a trained machine learning model based at least in part on an activity history of a user;
      determine an activity pattern associated with the user at a periodic interval based at least in part on using the trained machine learning model and identifying a sequence of a plurality of device interactions with the plurality of IoT endpoints, determining the activity pattern includes identifying for the sequence a first expected time for a first device interaction with a first IoT endpoint, a second expected time for a second device interaction with a second IoT endpoint, and an expected amount of time that the second device interaction is expected to occur from the first device interaction, wherein the first IoT endpoint comprises an electronic lock and the second IoT endpoint is a different type of IoT endpoint from the electronic lock;
      receive an activity indicator for the user based at least in part on a reporting from the electronic lock, wherein the reporting indicates a point in time in which the user enters or leaves a restricted area;
      determine an expected time-clock status for the user based at least in part on a current schedule of the user and the activity pattern associated with the user;
      compare the activity indicator with the current schedule of the user to identify a discrepancy for a current time-clock status of the user;
      in response to the identification of the discrepancy between the current schedule of the user and the current time-clock status of the user, determine a correct current time-clock status of the user based at least in part on the expected time-clock status for the user;
      update the current time-clock status of the user to reflect the correct current time-clock status of the user; and
      send a notification to a client device associated with the user, the notification being configured to cause a user interface to display an accept user interface component for accepting the update to the current time-clock status of the user on the client device.

2. The system of claim 1, wherein the machine-readable instructions further cause the computing device to at least compare the activity indicator with a plurality of time-clock histories associated with a plurality of additional users with a similar schedule as the user.

3. The system of claim 1, wherein the activity indicator comprises a scan of an access card associated with the user.

4. A system, comprising:
   a plurality of Internet of Things (IoT) endpoints that execute a reporting application;
   a computing device comprising a processor and a memory; and
   machine-readable instructions stored in the memory that, when executed by the processor, cause the computing device to at least:
      generate a trained machine learning model based at least in part on an activity history of a user;
      receive an activity indicator for the user based at least in part on a reporting from an electronic lock which is one of the plurality of IoT endpoints, wherein the reporting indicates a point in time in which the user enters or leaves a restricted area;
      obtain a current time-clock status of the user;
      obtain a current schedule of the user;
      determine an activity pattern associated with the user based at least in part on the trained machine learning model and a sequence of a plurality of device interactions with the plurality of IoT endpoints, the sequence comprising a first expected time for a first device interaction with a first IoT endpoint, a second expected time for a second device interaction with a second IoT endpoint, and an expected amount of time that the second device interaction is expected to occur from the first device interaction;
      determine an expected time-clock status for the user based at least in part on the current schedule of the user and the activity pattern associated with the user;
      determine that the current time-clock status of the user is incorrect based at least in part on the current schedule of the user and the activity indicator;
      update the current time-clock status of the user based at least in part on the expected time-clock status; and
      send a notification to a client device associated with the user, the notification being configured to cause a user interface to display an accept user interface component for accepting the update to the current time-clock status of the user on the client device.

5. The system of claim 4, wherein the notification comprises at least one of an email message or a short message service message.

6. The system of claim 4, wherein the machine-readable instructions further cause the computing device to at least:
   compare the activity indicator and the current time-clock status of the user with the activity history for the user; and
   wherein the machine-readable instructions that cause the computing device to determine that the current time-clock status of the user is incorrect is further based at least in part on a comparison of the activity indicator and the current time-clock status of the user with the activity history for the user.

7. The system of claim 4,
   wherein the machine-readable instructions that cause the computing device to determine that the current time-clock status of the user is incorrect apply the trained machine learning model to the activity indicator and the current time-clock status of the user to determine that the current time-clock status of the user is incorrect.

8. The system of claim 4, wherein the machine-readable instructions further cause the computing device to at least:
obtain a plurality of status histories related to a plurality of additional users with a same schedule as the user; and
wherein the machine-readable instructions that cause the computing device to determine the current time-clock status of the user is incorrect further cause the computing device to determine that the current time-clock status of the user is incorrect based at least in part on the plurality of status histories related to the plurality of additional users.

9. The system of claim 4, wherein the computing device is a first computing device, the activity indicator is a first activity indicator, and a second activity indicator is received from a second computing device in data communication with the first computing device.

10. The system of claim 9, wherein the second computing device is an industrial equipment device.

11. The system of claim 4, wherein the activity indicator represents a user activity performed when the current time-clock status of the user is expected to indicate that the user is currently working.

12. A method, comprising:
generating, via a computing device, a trained machine learning model based at least in part on an activity history of a user;
determining, via the computing device, an activity pattern associated with the user based at least in part on the trained machine learning model and a sequence of a plurality of device interactions with a plurality of IoT endpoints, wherein the sequence comprising a first expected time for a first device interaction with a first IoT endpoint, a second expected time for a second device interaction with a second IoT endpoint and an expected amount of time that the second device interaction is expected to occur from the first device interaction, wherein the first IoT endpoint comprises an electronic lock;
receiving an activity indicator for the user based at least in part on a reporting from the electronic lock, wherein the reporting indicates a point in time in which the user enters or leaves a restricted area;
verifying, via the computing device, a current time-clock status of the user based at least in part on the activity indicator associated with the user and a schedule of the user;
determining, via the computing device, an expected time-clock status for the user based at least in part on the schedule of the user and the activity pattern associated with the user;
generating, via the computing device, an update for the current time-clock status of the user based at least in part on the expected time-clock status, the update for the current time-clock status of the user is generated in response to a determination that the current time-clock status of the user is inconsistent with the activity indicator associated with the user and the schedule of the user; and
sending, via the computing device, a notification to a client device of the user, the notification being configured to cause a user interface to display an accept user interface component for accepting the update to the current time-clock status of the user on the client device.

13. The method of claim 12, further comprising:
receiving, via the computing device, an indication that the accept user interface component has been selected; and
updating, via the computing device, the current time-clock status of the user based at least in part on the receiving of the indication that the accept user interface component has been selected.

14. The method of claim 12, wherein:
verifying, via the computing device, the current time-clock status of the user is further based at least in part on historical activity data associated with the user; and
updating, via the computing device, the current time-clock status of the user is based at least in part on the historical activity data associated with the user.

15. The method of claim 12, wherein:
verifying, via the computing device, the current time-clock status of the user is further based at least in part on historical activity data associated with another user; and
updating, via the computing device, the current time-clock status of the user is based at least in part on the historical activity data associated with the other user.

16. The method of claim 12, wherein the activity indicator represents a user activity performed when the current time-clock status of the user is expected to indicate that the user is currently working.

17. The method of claim 12, wherein the computing device is a first computing device, the activity indicator is a first activity indicator, and the method further comprises receiving, via the computing device, a second activity indicator from a second computing device in data communication with the first computing device.

18. The method of claim 17, wherein the second computing device is an industrial equipment device.

19. The system of claim 1, wherein the machine-readable instructions stored in the memory that, when executed by the processor, cause the computing device to at least determine a correct time associated with the correct current time-clock status based at least in part on the activity indicator.

20. The method of claim 12, wherein the activity pattern is determined based at least in part on a periodic time interval or a triggering event.

* * * * *